2,845,438
Patented July 29, 1958

2,845,438

ESTERS OF GLYCOLS AND SULFURIZED FATTY ACIDS

Frederick E. Dearborn, Washington, D. C.

No Drawing. Continuation of application Serial No. 233,677, June 26, 1951. This application October 13, 1955, Serial No. 540,358

7 Claims. (Cl. 260—327)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation of application bearing Serial No. 233,677, filed June 26, 1951, now abandoned.

This invention relates to synthetic esters prepared from glycols and sulfurized fatty acids, and has among its objects the provision of such esters and a process of preparing them. Other objects will be apparent from the description of the invention.

The esters of the invention are suitable for the manufacture of drugs, pharmaceuticals, and cosmetic preparations, for the preparation of hair tonics, face creams, etc., in the manufacture of textiles, insecticidal sprays, and have many other industrial uses. Those esters which are liquid may be used as emulsifying agents for the manufacture of fluid emulsions in the textile, paper, leather, polishes, and the cosmetic industries. They also act as plasticizers, softeners, and flexibilizers for water-soluble and solvent-soluble gums and resins.

In general, according to the invention, the esters are produced by reacting a glycol with a sulfurized fatty acid at a temperature ranging from about 110° C. to 150° C. with or without a suitable catalyst, and preferably with suitable agitation to hasten removal of the water formed during the esterification. When the reactants have boiling points below 100° C. a dehydrating agent such as sulfuric acid or some other agent capable of combining with the water formed is used. The resulting glycol ester contains from one to six sulfurized double bonds and may be represented by the formula

XO—R—OY wherein R is the glycol residue, wherein X is the acyl radical of a sulfurized fatty acid containing from one to three sulfurized double bonds of the formula

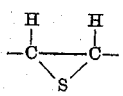

and wherein Y is selected from the group consisting of hydrogen, the acyl radical of a saturated fatty acid, and the acyl radical of a sulfurized fatty acid containing from one to three sulfurized double bonds of the formula

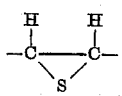

Glycols suitable for use in the process include diethylene glycol, ethylene glycol, propylene glycol, sorbitol, ethylene glycol monoethyl ether (Cellosolve), and diethylene glycol monoethyl ether (Carbitol). The preferred glycols are ethylene glycol, diethylene glycol, and propylene glycol and when these are used, the R in the above formula is the radical $C_2H_4$, $CH_2OC_2H_4$, and $CH(CH_3)CH_2$, respectively.

The sulfurized fatty acids suitable for use in the process include those obtained by sulfurization of the unsaturated fatty acids of the series $C_nH_{2n-2}O_2$, $C_nH_{2n-4}O_2$, $C_nH_{2n-6}O_2$, of unsaturated long chain hydroxy fatty acids such as ricinoleic acid, palmitoleic acid, and of other unsaturated acids, the sulfurized long chain fatty acids being particularly suitable.

I have previously shown in my Patents Nos. 2,169,793, 2,237,096, 2,333,093, and 2,427,717 that unsaturated long chain fatty acids containing from one to three double bonds in the molecule may chemically add one atom of sulfur to each double bond under suitable conditions to saturate the carbon to carbon linkage in the chain. The sulfur adds to the double bond to form a thiirane group which may be defined as a linkage of two adjacent carbon atoms to each other and to a sulfur atom. This may be represented as follows:

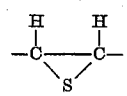

In preparing the sulfurized acids for use in the process of the invention, the unsaturated long chain fatty acids are sulfurized to the desired sulfur content. Acids containing more than one double bond in their molecule, form more than one sulfur compound, as for example, an acid containing two double bonds may form the mono- and the di-sulfur (di-thiirane) compounds, while an acid containing three double bonds may form the mono-, the di- and the tri-sulfur (tri-thiirane) compounds depending whether one, two, or three double bonds are saturated with sulfur. Selective sulfurization is brought about by the difference in reactiveness of the double bonds in the unsaturated fatty acid. The most reactive double bond in an acid containing more than one double bond is the one nearest the carboxyl group in a long chain, followed by the next nearest, while the one farthest away is generally the least reactive. The unsaturated fatty acids show a tendency for the double bond to occupy definite positions in the chain. The first double bond usually occurs on a multiple of three carbon atoms from the carboxyl, counting the carboxyl carbon atom as number one. The next double bond begins on a third carbon atom or a multiple of this number from the first double bond. This tendency toward regularity is shown by the following list of naturally occurring unsaturated long chain fatty acids:

Decenoic acid $CH_2=CH(CH_2)_7COOH$
Myristoleic acid $CH_3(CH_2)_3CH=CH(CH_2)_7COOH$
Palmitoleic acid $CH_3(CH_2)_5CH=CH(CH_2)_7COOH$
Oleic acid $CH_3(CH_2)_7CH=CH(CH_2)_7COOH$
Ricinoleic acid $CH_3(CH_2)_5CHOHCH_2CH=CH(CH_2)_7COOH$ Linoleic acid $CH_3(CH_2)_4CH=CHCH_2CH=CH(CH_2)_7COOH$ Linolenic acid $CH_3CH_2CH=CHCH_2CH$
$=CHCH_2CH=CH(CH_2)_7COOH$ Thus, on the basis of the foregoing, sulfurized oleic acid may be called 9,10-thiirane octadecanoic acid, sulfurized ricinoleic acid may be called 12-hydroxy-9,10-thiirane octadecanoic acid, mono-sulfurized linoleic acid may be called 9,10-thiirane-12-octadecenoic acid, di-sulfurized linoleic acid is 9,10-12,13-di-thiirane octadecanoic acid, mono-sulfurized linolenic acid may be called 9,10-thiirane-12,15-octadecadienoic acid, di-sulfurized linolenic acid may be called 9,10-12,13-di-thiirane-15-octadecenoic acid, and tri-sulfurized linoleic acid may be called 9,10-12,13-15,16-tri-thiirane octadecanoic acid.

The sulfurization of the unsaturated fatty acid may be carried out in the following manner: The acid is heated in a metal or other sulfur-resistant container at elevated temperature. When the temperature has reached approximately 170° C., the required amount of sulfur is added with continued heating. Catalysts such as iodine, bromine, or chlorine are used to cause the sulfur to enter the double bond or bonds. The use of bromine and chlorine give somewhat lightened colored products than iodine. When iodine is used, it is added in an amount equivalent to about 5 to 10 percent of the weight of the sulfur used, and is thoroughly mixed with the sulfur before adding to the hot acid. Part of the iodine combines with the sulfur forming sulfur-iodine compounds, as shown by the change in color of the sulfur. When bromine is used as a catalyst, liquid bromine in the amount equivalent to about 10 percent of the weight of the sulfur to be used, is dissolved in chloroform or carbon tetrachloride and thoroughly mixed with the fatty acid before heating. When chlorine is used as catalyst, dry chlorine gas is passed through the anhydrous fatty acid at room temperature until about 0.5 percent by weight of chlorine has combined with the acid. After the sulfur has been added, heating is continued until a temperature of about 200° to 210° C. is reached where it is held until the sulfur has combined with the double bond or bonds, as shown by test. Suitable agitation is maintained throughout the entire reaction period and the top of the reaction mixture may be blanketed with an inert gas, such as carbon dioxide, to prevent any possibility of oxidation taking place during the heating and cooling.

The test mentioned above to show the combination of sulfur with the double bond or bonds, involves removing a few drops of the hot acid which are placed on a glass plate held in a vertical position so that the hot acid will run down the surface of the glass leaving a thin film. If the film is transparent on cooling, the sulfur has combined, but if it is opaque or cloudy, uncombined sulfur is present thus requiring longer heating.

The more reactive double bond adds sulfur at a lower temperature than the less reactive double bonds. To produce sulfur compounds from an acid containing more than one double bond, only sufficient sulfur is used to saturate one double bond (32 grams of sulfur per molecule of acid) to form the monosulfur compound, while 64 and 96 grams of sulfur are used to produce the di- and the tri-sulfur compounds, respectively. In other words, each double bond in an unsaturated fatty acid will combine with 32 grams of sulfur per molecule of acid.

Since the glycols are dihydric alcohols, two different esters are possible with the same acid, depending upon whether one or two hydroxyl (OH) groups are replaced by the acid radical. When one hydroxyl group is replaced by the acid radical, the ester produced is the mono-glycol ester, and when both hydroxyl groups are replaced by acid radicals, the ester is the di-glycol ester. The formation of the various esters is illustrated by the following equations using propylene glycol and sulfurized oleic acid as the reactants:

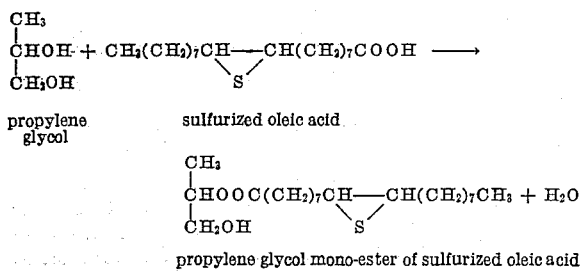

propylene glycol mono-ester of sulfurized oleic acid

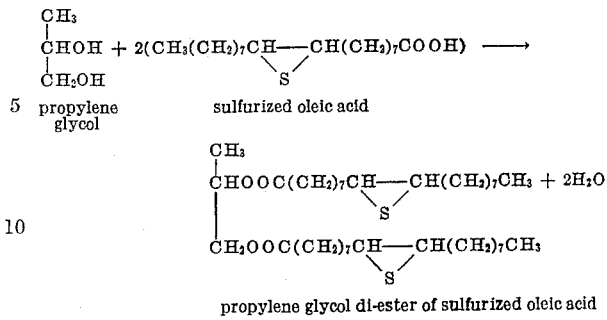

propylene glycol di-ester of sulfurized oleic acid

Mixed esters are formed by reacting a glycol with two different long chain fatty acids, one of which must be a sulfurized long chain fatty acid, or both may be sulfurized long chain fatty acids. Thus, if propylene glycol is heated with only enough sulfurized oleic acid to form the mono-ester and then heated with another acid, such as a saturated long chain fatty acid like palmitic, in an amount sufficient to form the di-ester, a mixed ester will result. The same results may be obtained by heating equal molecular proportions of the different acids with the glycol to form the diester.

Since fatty acids containing more than one double bond may be sulfurized to contain from one to three atoms of sulfur per molecule of the acid, it is evident that a wide variety of glycol esters may be prepared containing from one to six atoms of sulfur per molecule of the ester.

The following examples are illustrative of the invention:

EXAMPLE 1

*Diethylene glycol mono-ester of sulfurized oleic acid*

The diethylene glycol mono-ester of sulfurized oleic acid is prepared by heating an excess of diethylene glycol with sulfurized oleic acid at a temperature ranging from 110° to 150° C. or higher with suitable agitation to hasten the removal of the water formed during esterification. The progress of the esterification can be checked by determining the amount of free fatty acid in a sample removed for analysis. When there is no free fatty acid present, as determined by analysis, esterification is complete. The excess glycol can be removed by distillation under reduced pressure or removed by washing with water.

The product is a dark red oil, having a specific gravity of .94–.96 and a saponification value of 138–140. It is soluble in ethanol, hydrocarbons, vegetable oils and mineral oils.

EXAMPLE 2

*Diethylene glycol di-ester of sulfurized oleic acid*

This ester is prepared in a similar manner as in Example 1, above, with the exception that the ratio of two molecules of sulfurized oleic acid is used for one molecule of the glycol. A small amount of the glycol is lost during the heating and at the end of the esterification, some uncombined acid is present. Sufficient glycol is added to combine with this free acid and heating is continued until esterification is complete.

The product is a dark red oil with a specific gravity of approximately .93 and a saponification value of 159–162. It has solubilities similar to the mono-ester.

EXAMPLE 3

*Diethylene glycol mono-ester of sulfurized ricinoleic acid*

This compound is prepared in a similar manner as Example 1, above, using sulfurized ricinoleic acid in place of sulfurized oleic acid. It is a dark red oil with a specific gravity of .95–.98 and a saponification value of 144–146. It is soluble in methanol, ethanol, toluene, mineral, and vegetable oils.

EXAMPLE 4

*Diethylene glycol di-ester of sulfurized ricinoleic acid*

This compound is prepared by reacting sulfurized ricinoleic acid and diethylene glycol, following the procedure described in Example 2, above, in the proportion of two molecules of the former to one molecule of the latter. It has a specific gravity of .93 to .95 and a saponification value of 167–170. It has about the same solubility as the compound of Example 3.

EXAMPLE 5

*Diethylene glycol mono-ester of mono-sulfurized linoleic acid*

This compound is prepared by following the procedure of Example 1, above, using linoleic acid in which one double bond has been saturated with sulfur. It has a specific gravity of .94–.95 and a saponification value of 133–138. It is a dark red oil, with solubility similar to the product of Example 1.

EXAMPLE 6

*Diethylene glycol di-ester of mono-sulfurized linoleic acid*

This compound is prepared following procedure similar to Example 2, above, using linoleic acid in which one double bond has been saturated with sulfur. It is a dark red oil, having a saponification value of 153–156 and a specific gravity of approximately .93–.94. Its solubility is approximately that of the mono-ester of Example 5.

EXAMPLE 7

*Diethylene glycol mono-ester of di-sulfurized linoleic acid*

This compound is prepared by heating sulfurized linoleic acid in which both double bonds have been saturated with sulfur, with an excess of diethylene glycol at a temperature ranging from 110° to 150° C. with suitable agitation until esterification is complete. It has a saponification value of 127–130. It is a dark red oil somewhat more viscous than the similar compound of Example 5 containing one double bond of linoleic acid saturated with sulfur.

EXAMPLE 8

*Diethylene glycol di-ester of di-sulfurized linoleic acid*

This compound is prepared by reacting diethylene glycol with di-sulfurized linoleic acid in which the two double bonds have been saturated with sulfur. One mole of the glycol to two moles of the acid are used. A slight excess of diethylene glycol is added towards the end of the esterification, as some glycol is lost through vaporization, a sufficient amount being added to completely esterify the acid. Any excess glycol can be removed by distillation under reduced pressure or washing out with water. The product should be practically neutral. It is a dark red viscous oil and has a saponification value of 148–153.

EXAMPLE 9

*Ethylene glycol mono-ester of sulfurized oleic acid*

This compound is prepared in the same manner as that described under Example 1, above, using ethylene glycol in place of diethylene glycol. It is a dark red oil having a specific gravity of .92 and a saponification value of 156–160. It has the same solubility in solvents as the diethylene glycol mono-ester of sulfurized oleic acid.

EXAMPLE 10

*Ethylene glycol mono-ester of sulfurized ricinoleic acid*

This compound is prepared in a manner similar to that described in Example 9, above, using sulfurized ricinoleic acid in place of sulfurized oleic acid and has solubility characteristics similar to the product of that example. It is a dark red oil and is more viscous than the compound described in Example 9, above. It has a specific gravity of .95 and a saponification value of 147–150.

EXAMPLE 11

*Ethylene glycol di-ester of sulfurized ricinoleic acid*

This compound is prepared in a manner similar to that described for the di-esters above, using ethylene glycol instead of diethylene glycol. It has a specific gravity of .93 and a saponification value of 160–165. It is soluble in ethanol, mineral oil, vegetable oils, and hydrocarbons.

EXAMPLE 12

*Propylene glycol mono-ester of sulfurized oleic acid*

This compound is prepared by reacting sulfurized oleic acid with an excess of propylene glycol at a temperature of 110° to 150° C. with suitable agitation. Any excess propylene glycol may be removed by distillation under reduced pressure or by washing with water.

The product is a dark red oil having a specific gravity of .95 and a saponification value of 148–154. It is soluble in ethanol, toluene, mineral oil, and vegetable oils.

EXAMPLE 13

*Propylene glycol di-ester of sulfurized oleic acid*

This compound is prepared by reacting one part of propylene glycol with two parts of sulfurized oleic acid in a manner similar to that of Example 12, above. When the esterification is nearly complete, a slight excess of the glycol is added to complete the esterification to replace some of the glycol lost during the esterification. The product should be practically neutral on completion of the esterification. Any excess glycol can be removed by distilling off under reduced pressure or washing out with water. The product is a viscous dark red oil having a specific gravity of approximately .93 and a saponification value of 168–170. It has practically the same solubility in solvents as the mono-ester.

EXAMPLE 14

*Propylene glycol mono-ester of sulfurized ricinoleic acid*

This compound is prepared in the same manner as described under Example 12, above, using sulfurized ricinoleic acid in place of the sulfurized oleic acid. It is a dark red oil having a specific gravity of .98 and a saponification value of 143–148. It is soluble in methanol, ethanol, mineral oil, and vegetable oils.

EXAMPLE 15

*Propylene glycol mono-ester of mono-sulfurized linolenic acid*

This compound is prepared by heating an excess of propylene glycol with sulfurized linolenic acid in which one double bond of the acid has been saturated with sulfur, at a temperature of 110° to 150° C. with suitable agitation until the acid has combined with the propylene glycol. A neutral, dark red oil is obtained which has a saponification value of 152–155. The excess glycol is removed by distilling off under reduced pressure or by washing with water.

EXAMPLE 16

*Propylene glycol di-ester of mono-sulfurized linolenic acid*

This compound is prepared by heating two moles of sulfurized linolenic acid in which only one double bond has been saturated with sulfur, with one mole of propylene glycol at a temperature ranging from 110° to 150° C. with agitation. Due to some loss of the glycol by volatilization, a slight excess of the glycol is added after heating until nearly esterified. The excess glycol is removed by washing with water or distilling under reduced pressure. The product obtained is a dark red oil having a saponification value of 169–173.

EXAMPLE 17

*Propylene glycol mono-ester of di-sulfurized linolenic acid*

This compound is prepared in a similar manner to that described under Example 15, above, with the exception that linolenic acid is used in which two double bonds have been saturated with sulfur. This compound is a dark red oil, is more viscous than the similar compound containing less sulfur, and has a saponification value of 140–145.

EXAMPLE 18

*Propylene glycol di-ester of di-sulfurized linolenic acid*

This compound is prepared in the same manner as in Example 16, above, with the exception that linolenic acid in which two double bonds have been saturated with sulfur is used. The compound is a dark red oil, more viscous than the mono-ester and has a saponification value of 155–160.

EXAMPLE 19

*Propylene glycol mono-ester of tri-sulfurized linolenic acid*

This compound is prepared in a similar manner as the compound described under Example 15, above, with the exception that fully sulfurized linolenic acid is used in which the three double bonds have been saturated with sulfur. This compound is a dark red, viscous oil, having a saponification value of 129–133.

EXAMPLE 20

*Propylene glycol di-ester of tri-sulfurized linolenic acid*

This compound is prepared in a manner similar to the preparation of the compound described under Example 16, above. It is a very viscous dark red oil and has a saponification value of 142–145.

Since the glycols are capable of forming the mono- and the di-esters, it is apparent that glycol esters can be made containing a sulfurized fatty acid and an unsulfurized fatty acid. These mixed esters, the preparation of which is illustrated by Examples 21 and 22, following, will be di-esters as both of the hydroxyl groups in the glycol are replaced by two different acid radicals.

EXAMPLE 21

*Propylene glycol ester of sulfurized oleic acid and palmitic acid*

This compound is prepared by reacting sulfurized oleic acid with an excess of propylene glycol, removing the excess glycol, and then reacting the mono-ester with palmitic acid in proper proportions to form the di-ester. The sulfurized oleic acid replaces one hydroxyl group while the palmitic acid replaces the other, forming the di-ester. This compound is much lighter in color than where the acids are all sulfurized. It is more viscous than the corresponding di-ester of oleic acid described under Example 13 and has a saponification value of 183–185.

EXAMPLE 22

*Propylene glycol ester of sulfurized oleic and ricinoleic acids*

This compound is prepared in a similar manner as in Example 21, above, first forming the mono-ester of either the sulfurized oleic acid or the sulfurized ricinoleic acid. After removing the excess of the glycol, the mono-ester is reacted with the other acid to form the di-ester. A small amount of the glycol may be added as some of the glycol is lost through volatilization on heating. The product is a dark red oil, somewhat more viscous than the product obtained in Example 13. It has a saponification value of 163–165.

Due to the fact that the various fatty acids are very difficult to produce pure, it is evident that the glycol esters of the sulfurized fatty acids when made commercially will contain a small percentage of other esters. U. S. P. oleic acid, for example, may contain a small amount of saturated fatty acids, which, when esterified with a glycol, will form the glycol esters.

I claim:

1. A process for preparing a glycol ester of the formula

XO—R—OY wherein R is a radical selected from the group consisting of $C_2H_4$, $CH_2OC_2H_4$, $CH(CH_3)CH_2$, respectively, wherein X is the acyl radical of a sulfurized long chain fatty acid containing from one to three sulfurized double bonds of the formula

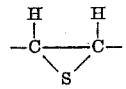

and wherein Y is selected from the group consisting of hydrogen, the acyl radical of a saturated long chain fatty acid, and the acyl radical of a sulfurized long chain fatty acid containing from one to three sulfurized double bonds of the formula

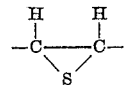

comprising heating a glycol selected from the group consisting of ethylene glycol, diethylene glycol, and propylene glycol with an amount of a sulfurized long chain fatty acid, containing from one to three sulfurized double bonds of the formula

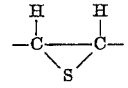

in the molecule, sufficient to esterify only one hydroxyl group of the glycol, at a temperature of about from 110° C. to 150° C. thereby to produce a glycol mono-ester of the formula

XO—R—OY wherein R and X have the same value as above and Y is hydrogen, and heating the said mono-ester with an amount of an acid, selected from the group consisting of a saturated long chain fatty acid and a sulfurized long chain fatty acid having from one to three sulfurized double bonds of the formula

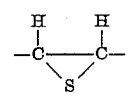

in its molecule, sufficient to esterify the remaining hydroxyl group of the said mono-ester, at a temperature of about from 110° C. to 150° C. thereby to produce a di-ester of the glycol having the formula

XO—R—OY wherein R and X have the same value as above and Y is selected from the group consisting of the acyl radical of the saturated long chain acid and the acyl radical of the sulfurized long chain fatty acid reacted with the mono-ester.

2. A process comprising heating a glycol selected from the group consisting of ethylene glycol, diethylene glycol, and propylene glycol with an amount of a sulfurized long chain fatty acid, containing from one to three sulfurized double bonds of the formula

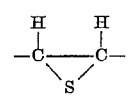

in the molecule, sufficient to esterify only one hydroxyl group of the glycol, at a temperature of about from 110° C. to 150° C. thereby to produce a glycol mono-ester of the said sulfurized long chain fatty acid.

3. The process of claim 2 wherein the sulfurized long chain fatty acid is sulfurized oleic acid having the formula

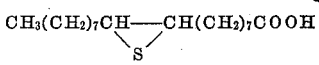

and the glycol is propylene glycol.

4. A process comprising heating a glycol selected from the group consisting of ethylene glycol, diethylene glycol, and propylene glycol with an amount of a sulfurized long chain fatty acid, containing from one to three sulfurized double bonds of the formula

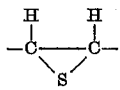

in the molecule, sufficient to esterify only one hydroxyl group of the glycol, at a temperature of about from 110° C. to 150° C. thereby to produce a glycol mono-ester of the said sulfurized long chain fatty acid, and heating the said glycol mono-ester with an amount of a saturated long chain fatty acid sufficient to esterify the remaining hydroxyl group of the said mono-ester, at a temperature of about from 110° C. to 150° C. thereby to produce a di-ester of the glycol with the said sulfurized long chain fatty acid and the said saturated long chain fatty acid.

5. The process of claim 4 wherein the glycol is propylene glycol, the sulfurized fatty acid is sulfurized long chain oleic acid having the formula

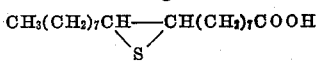

and the saturated fatty acid is palmitic acid.

6. A process comprising heating a glycol selected from the group consisting of ethylene glycol, diethylene glycol, and propylene glycol with an amount of a sulfurized long chain fatty acid, containing from one to three sulfurized double bonds of the formula

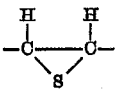

in the molecule, sufficient to esterify only one hydroxyl group of the glycol, at a temperature of about from 110° C. to 150° C. thereby to produce a glycol mono-ester of the said sulfurized long chain fatty acid, and heating the said glycol mono-ester with an amount of a second sulfurized long chain fatty acid, different from the first sulfurized long chain fatty acid but also containing from one to three sulfurized double bonds of the above formula in its molecule, sufficient to esterify the remaining hydroxyl group of the said mono-ester, at a temperature of about from 110° C. to 150° C. thereby to produce a di-ester of the glycol with the two different sulfurized long chain fatty acids, said di-ester thus containing from two to six sulfurized double bonds of the formula

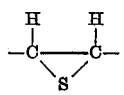

in the molecule.

7. The process of claim 6 wherein the glycol is propylene glycol and the two different sulfurized long chain fatty acids are sulfurized oleic acid having the formula

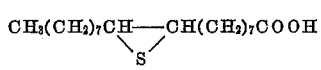

and sulfurized ricinoleic acid having the formula

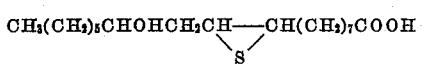

References Cited in the file of this patent

UNITED STATES PATENTS

| | | |
|---|---|---|
| 2,237,096 | Dearborn | Apr. 1, 1941 |
| 2,333,093 | Dearborn | Nov. 2, 1943 |
| 2,549,525 | Roberts | Apr. 17, 1951 |
| 2,628,939 | Blake | Feb. 17, 1953 |